United States Patent [19]

Salour

[11] Patent Number: 4,764,731
[45] Date of Patent: Aug. 16, 1988

[54] LIGHT-INDUCED UNIDIRECTIONAL LIGHT AMPLIFIER

[75] Inventor: Michael M. Salour, Cambridge, Mass.

[73] Assignee: The United States of America as represented by the Secretary of the Navy, Washington, D.C.

[21] Appl. No.: 94,201

[22] Filed: Sep. 8, 1987

Related U.S. Application Data

[63] Continuation of Ser. No. 310,938, Oct. 13, 1981.

[51] Int. Cl.[4] ............................ H01S 3/00; H01S 3/10
[52] U.S. Cl. .................................... 330/4.3; 332/7.51; 372/21
[58] Field of Search ...................... 330/4.3; 372/18.11, 372/12, 21.28, 31, 32

[56] References Cited

U.S. PATENT DOCUMENTS 4,019,156  4/1977  Fountain et al. ...................... 372/18
4,291,282  9/1981  Alfano et al. .......................... 372/81
4,375,684  3/1983  Everett ................................. 372/18

OTHER PUBLICATIONS

Petite et al., "Observation of . . . Light Shifts", 8/8/80, pp. 1-5, NTIS AD-A093.
Petite et al., "Observation of . . . Light Shifts", 10/13/80, pp. 1242-1245, Phys. Rev. Lett., vol. 45, #15.
Cohen et al., "Compensating Doppler . . . Shifts", 10/78, pp. 71-75, Opt. Comm., vol. 27, #1.
Reynaud et al., "Compensation of . . . Light-Shifts", 1979, pp. 96-105, vol. 4.

Primary Examiner—Nelson Moskowitz
Attorney, Agent, or Firm—Prithvi C. Lall; Arthur A. McGill; Michael J. McGowan

[57] ABSTRACT

A unidirectional light amplifier is described wherein laser light is utilized to create an anisotropic medium in which light is fully amplified in only one direction and fully absorbed in the opposite direction. It is analogous to the way in which a junction diode conducts electrical current more easily in one direction than in the other direction.

10 Claims, 3 Drawing Sheets

LIGHT-INDUCED UNIDIRECTIONAL LIGHT AMPLIFIER

This application is a continuation, of application Ser. No. 310,938, filed Oct. 13, 1981.

BACKGROUND OF THE INVENTION

This invention relates to non-linear optical processes in gas phases and, more particularly, to a unidirectional light amplifier using a plurality of lasers.

With the advances of non-linear optical processes in gas phases it is desirable to study ultrafast coherent transient spectroscopic techniques to probe the basic physics of non-linear interactions of light with matter. It is particularly useful to use the light shift induced by the interaction of atoms with intense monochromatic light which can be used to compensate for Doppler broadening. It is usually preferable to implement high intensity lasers using gaseous media instead of solid media in order to avoid destructive thermal stress on solid materials used in such systems. However, the atoms of a gaseous medium experience thermal motion due to their not being locked into a relatively rigid lattice structure. Consequently, if excited gaseous atoms emit light, the photons so emitted have a range of thermal velocities which causes a Doppler shift (i.e. change in frequency of the photons or radiation) along the axis of observation. This effect gives rise to Doppler broadening of the radiation with the result that the energy is spread over a larger bandwidth of frequencies of the photons. However, if the excited gaseous atoms are subjected to monochromatic light of appropriate wavelength from a laser, the energy levels of the excited atoms may be shifted as a result of Stark effect due to the electromagnetic field of the impinging radiation from the laser. Such shifts in the energy levels are velocity-dependent and can be used to obtain Doppler free radiation. CohenTannoudji et al first demonstrated theoretically in their paper entitled "Compensating Doppler Broadening with Light Shifts", Optics Communications, Vol. 27, pp. 71–75 (October 1978) that an external laser could be used to compensate for Doppler shift of the emitted radiation from excited atoms by arranging the velocity-dependent light-induced effect to be complementary to Doppler broadening and thus the two effects cancelling each other. Reynaud et al in their paper entitled "Compensation of Doppler Broadening by a Velocity-Dependent Light-Shifts", Laser Spectroscopy, Vol. 4 (1979) pp. 96–105 discuss on pages 98, 104, observation of Doppler-free spectral lines in an experiment on neon and thus demonstrated forward/backward asymmetry for the emitted radiation. However, the true unidirectionality of the emitted radiation and its amplification characteristic beyond a threshold was not experimentally demonstrated and it was considered desirable to explore these aspects. It is thus desirable to have a light-induced unidirectional light amplifier system which can have wide applications.

SUMMARY OF THE INVENTION

The objects and advantages of the present invention are accomplished by using the principle wherein the single state $|a\rangle$ of a $|c\rangle \rightarrow |a\rangle$ atomic transition is coupled to a doublet $|b_+\rangle$, $|b_-\rangle$ by a laser tuned between $|a\rangle \rightarrow |b_+\rangle$ and $|a\rangle \rightarrow |b_-\rangle$ resonances. There is a frequency $\omega Lo$ around which the peturbed energy of $|a\rangle$ depends linearly on $\omega L - \omega Lo$ where $\omega L$ is the frequency seen by an atom in the rest frame. With the laser tuned to $\omega Lo$, a moving atom will see a laser frequency detuned from $\omega Lo$ by an amount proportional to its velocity (Doppler shift). The frequency shift of the $|c\rangle \rightarrow |a\rangle$ transition will, therefore, be proportional to this velocity. The constant of proportionality can be set by choosing the laser intensity so that the light-induced shifts and Doppler shifts of the $|c\rangle \rightarrow |a\rangle$ transition cancel for the emission in the direction of propagation of the laser beam, and add in the backward direction to double the Doppler broadening. If we consider an inverted medium with respect to $|c\rangle \rightarrow |a\rangle$ transition, it will emit photons and stimulated emission dominates in the form of an avalanche effect if the gain is large enough. This type of emission is known as superfluorescence or amplified stimulated emission (ASE) which is subject to a threshold-like condition wherein the threshold is exceeded when $g(\omega)$ 1. $\Delta\omega > 20$ where $g(\omega)$ is the gain or amplification per unit of interaction length per unit bandwidth associated with the radiation of frequency $\omega$, l is the interaction length and $\Delta\omega$ is the bandwidth of the line. Thus, Doppler broadening is an important limitation to the maximum amplitude of superfluorescence or ASE. Compensation of Doppler effect brings the gain bandwidth from the Doppler width (approximately 1 gigahertz, $GHz = 10^9$ cycles/sec) down to the natural width of emitting transition (approximately 50 megahertz i.e. 50 MHz) thus leading to an important increase in the gain amplitude for superfluorescence. Since the amplitude of superfluorescence is also proportional to the population inversion on the $|c\rangle \rightarrow |a\rangle$ transition, Doppler compensation will lead to a dramatic decrease of the threshold population inversion beyond which superfluorescence is allowed to develop. Using the Doppler compensation method as described above, it is possible to switch the emitting medium into a fast superfluorescence decay state, through introduction of a compensating laser pulse. (This fast decay pulse liberates a pulse of light that otherwise would not appear, so the compensating laser "switches on" this light). Besides, if the compensating laser is turned off, the emitting medium will resume the normal fluorescent state, i.e. superfluorescence is "switched off". Since one of the main features of the Doppler compensation method by velocitydependent light shift is its high degree of anistrophy and non-linearity, it provides a method for amplifying light in a unidirectionally amplifying medium. Due to the high non-linearity of the system, one can expect high anistrophy and amplification to be obtained even by only partial compensation of the Doppler effect.

In particular, a light induced unidirectional light amplifier is accomplished by using sodium vapor as the medium and a pump laser of wavelength 685.6 nm (1 nm = $10^{-9}$ meters) to pump two photons of wavelength 6856°A (1°A = $10^{-10}$ meter) to populate $3D_{3/2, 5/2}$ states of sodium and causing population inversion between states $3D_{3/2, 5/2}$ and $3P_{1/2}$. A compensatirg laser of tunable wavelength of 568.8 nm is used to cause velocitydependent light shift to compensate for the Doppler shift and thus obtain an anisotropic medium used for light-induced light amplifier of subject invention. Another laser is used to insure that the compensating laser is properly tuned to obtain unidirectional light amplication.

An object of subject invention is to have a light induced unidirectional light amplification system.

Another object of subject invention is to create an anisotropic medium in which light is amplified in only one direction and cancelled in the opposite direction.

Still another object of the subject invention is to have a system in which light is amplified in only one direction.

Another object of subject invention is to have a system in which Doppler broadening of atomic transitions is cancelled by light shifts in the system.

Still another object of subject invention is to obtain Doppler-free resonances in atomic transitions and thus creating a highly anisotropic medium.

Other objects, advantages and novel features of the invention will become apparent from the following detailed description of the invention when considered in conjunction with the accompanying drawings wherein:

DESCRIPTION OF A PREFERRED EMBODIMENT

Figure 2:
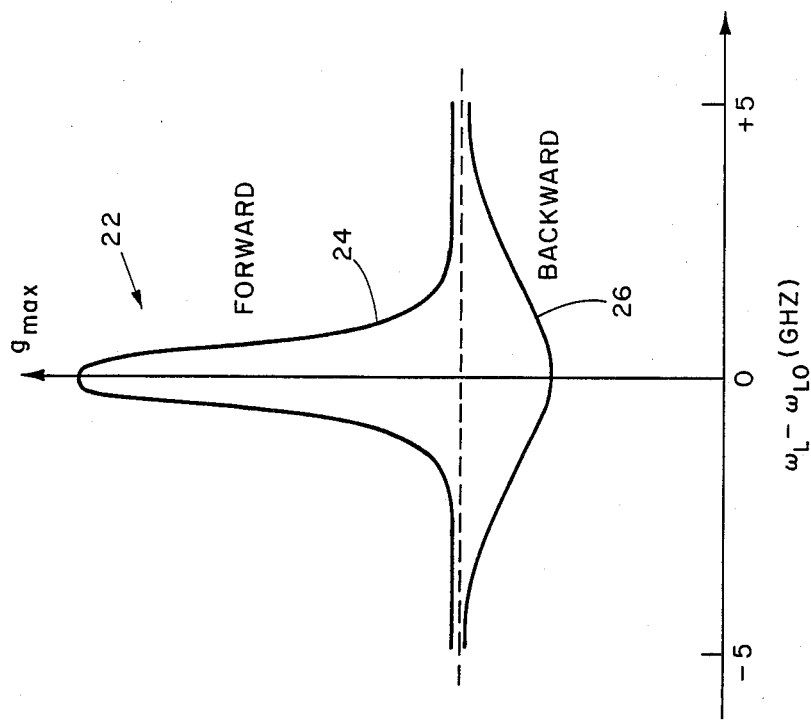
FIG. 2 is theoretical representation of the anisotropic behavior of light using the concept of subject invention.
Figure 1:
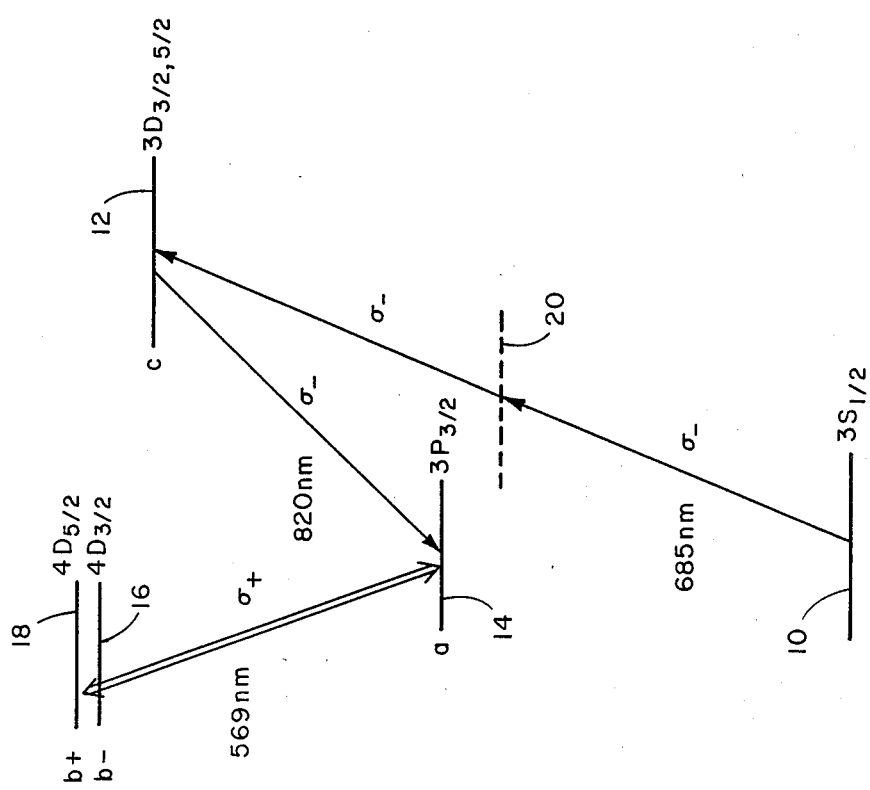
FIG. 1 is a schematic representation of the atomic transitions involved in the teachings of subject invention wherein sodium vapor is used as the medium.

Referring to the drawings wherein like numbers represent like parts, FIG. 1 is a representation of the atomic transitions involved in an embodiment of subject invention. It should be noted that all the wavelengths for various photons as shown in the figures are written as whole numbers in terms of nm (1 nm = $10^{-9}$ meter) for simplicity and are a little different from the values used in the text. Furthermore, atomic states such as states a and c are designated as $|a\rangle$ and $|c\rangle$ respectively. As shown in FIG. 1, state 10 ($3S_{1/2}$) of sodium is excited by means of a laser using two photons of wavelength 685.5 nm to state 12 ($3D_{3/2, 5/2}$) with a large probability for $3D_{5/2}$ state to create population inversion with regard to state 14 ($3P_{3/2}$). A compensating laser is tuned between states 16 and 18 which are $4D_{3/2}$ and $4D_{5/2}$ states of sodium so as to achieve forward/ backward enhancement of light of wavelength 819.6 nm. Level 20 indicates a halfway mark between states or levels 10 and 12. FIG. 2 is a theoretical graphical representatio 22 of the gain in the forward and backward directions wherein curve 24 represents variation of the gain in the forward direction and curve 26 represents gain variation in the backward direction.

Figure 3:
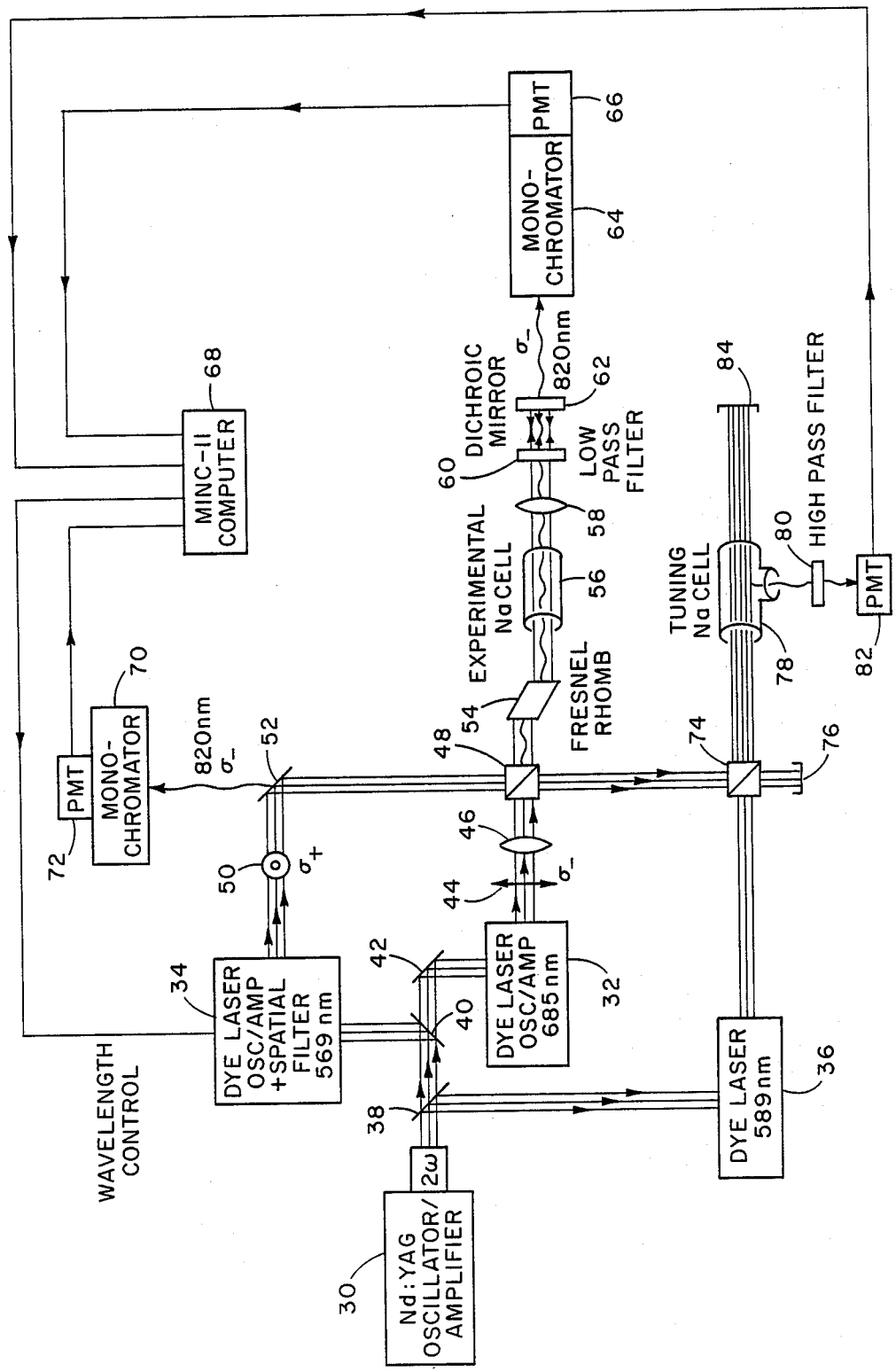
FIG. 3 is a diagrammatic representation of an embodiment of subject invention.

FIG. 3 is a block diagram from an embodiment of the invention wherein a Q-switch Nd:YAG oscillator/amplifier 30 is used to pump two-photons of wavelength 685.5 nm in order to achieve population inversion for $3D_{3/2, 5/2}$—$3P_{3/2}$ transition Nd:YAG oscillator/amplifier 30 is of wavelength 1.06 micron (1 micron = $10^{-6}$ meters) and is used for pumping laser 32 of fixed wavelength 685.6 nm and which is also preferably called a "pump laser" 34 of fixed wavelength 589.6 nm and tunable wavelength laser 34 of wavelength tunable around 569 nm. It is the second harmonic of laser 30 which is used to energize lasers 32, 34, and 36. The output of laser 30 is passed through beam splitters 38 and 40 and mirror 42 for energizing lasers 34 and 32 respectively. The light reflected by beam splitter 38 energizes laser 36. The light transmitted through beam splitter 38 and reflected by beam splitter 40 energizes tunable dye laser 34. The light transmitted by beam splitter 40 is reflected by mirror 42 and is used to energize dye laser 32 having a fixed wavelength 685.6 nm. The output of laser 32 is vertically polarized as shown by arrow 44 to give 685.6 nm radiation with a polarization of $\sigma_-$ for a favorable quantum transition. This radiation is collimated by a lens 46 and is passed through a beam splitter 48. Light from beam splitter 40 is used to energize compensating laser 34. Output of laser 34 is horizontally polarized as shown by circle 50 and has a polarization of $\sigma_-$. This radiation is reflected by beam splitter 52 and then reflected by beam splitter 48. The output of beam splitter 48 now contains vertically polarized 685.6 nm radiation and horizontally polarized 568.5 nm radiation and is passed through a Fresnel rhomb 54 which acts as a polarizer and is then coupled to experimental sodium cell 56 which includes sodium vapor at a pressure of a millitorr (1 millitorr = $10^{-3}$ mm of Hg) and provides the interaction region for obtaining an anisotropic medium. The output of cell 56 is passed through a collimating lens 58 and then through a low pass filter 60 which allows only light or radiation of wavelengths 568.5 nm and 819.6 nm to pass through. Dichroic mirror 62 allows only the light of wavelength 819.6 nm having polarization of $\sigma_-$ to pass therethrough which is further monochromatized by monochromator 64 and which energizes photomultiplier 66. The output of photomultiplier 66 is used as one of the inputs to MINC-11 computer 68. The back scattered radiation of wavelength 819.6 nm inside sodium cell 56 passes through Fresnel rhomb 54 and after passing through beam splitters 48 and 52 is further monochromatized by monochromator 70 which acts as a narrowband filter and is coupled to photo tube 72 the output of which is used as an another input for computer 68. Thus the outputs of photomultipliers 66 and 72 measure the forward and backward intensity of radiation of wavelength 819.6 nm with $\sigma_-$ polarization which is the quantum mechanically favored radiation for the transition. Computer 68 also controls the frequency of compensating dye laser 34 and thus controls its wavelength. The output of laser after combining with 685.5 nm radiation is focused on tuning sodium cell 78. The output of tuning cell 78 is then filtered for 330.3 nm radiation which establishes the tuning of compensating laser 34. 330.3 nm radiation which energizes photo tube 82 the output of which is used as another output for computer 68.

In operation, the experimental set-up 30 which is an amplified Q-switched Nd:YAG laser is used to pump two dye lasers, oscillator/amplifier systems, 32 and 34. Pump laser 30 is tuned to the 3S-3D two photon transition of sodium at 685.5 nm. Compensating dye laser 34 is tunable to the $3P_{3/2}$-$4D_{3/2, 5/2}$ transition of sodium at 568.8 nm. Laser 32 which is commonly referred to as "pump laser" produces 3-n. sec. (1 n sec. is = $10^{-9}$ sec.) pulses at a 10 hertz (Hz) repetition rate with an energy of which 1 milli-joule per pulse after two stages of amplification. The pumping laser 32 is tightly focused in sodium cell 56 which operates at a pressure of a few milli-torrs (1 torr = 1 mm of Hg) of sodium. To insure a proper pumping into entire Doppler width a counter propagating, two-photon pump scheme is utilized.

Compensating laser 34 operates in a single longitudinal cavity mode and is built following a standard design such as Littman's design. Tuning is accomplished by rotation of a grating (coarse tuning) and translation of an end reflector mounted on a piezoelectric translator (fire tuning). Both tuning mechanisms are controlled by computer 68. The pulse delivered by the compensating laser 34 has a duraticn of 5 n. sec. It is amplified in two stages and spatially filtered to obtain a smooth-beam profile with power densities in the interaction region as high as 20 megawatts per square centimeter (20 Mw/cm$^2$). The pumping and compensating laser 32 and 34 are spatially and temporarily overlapped in the sodium cell 56.

Figure 4:
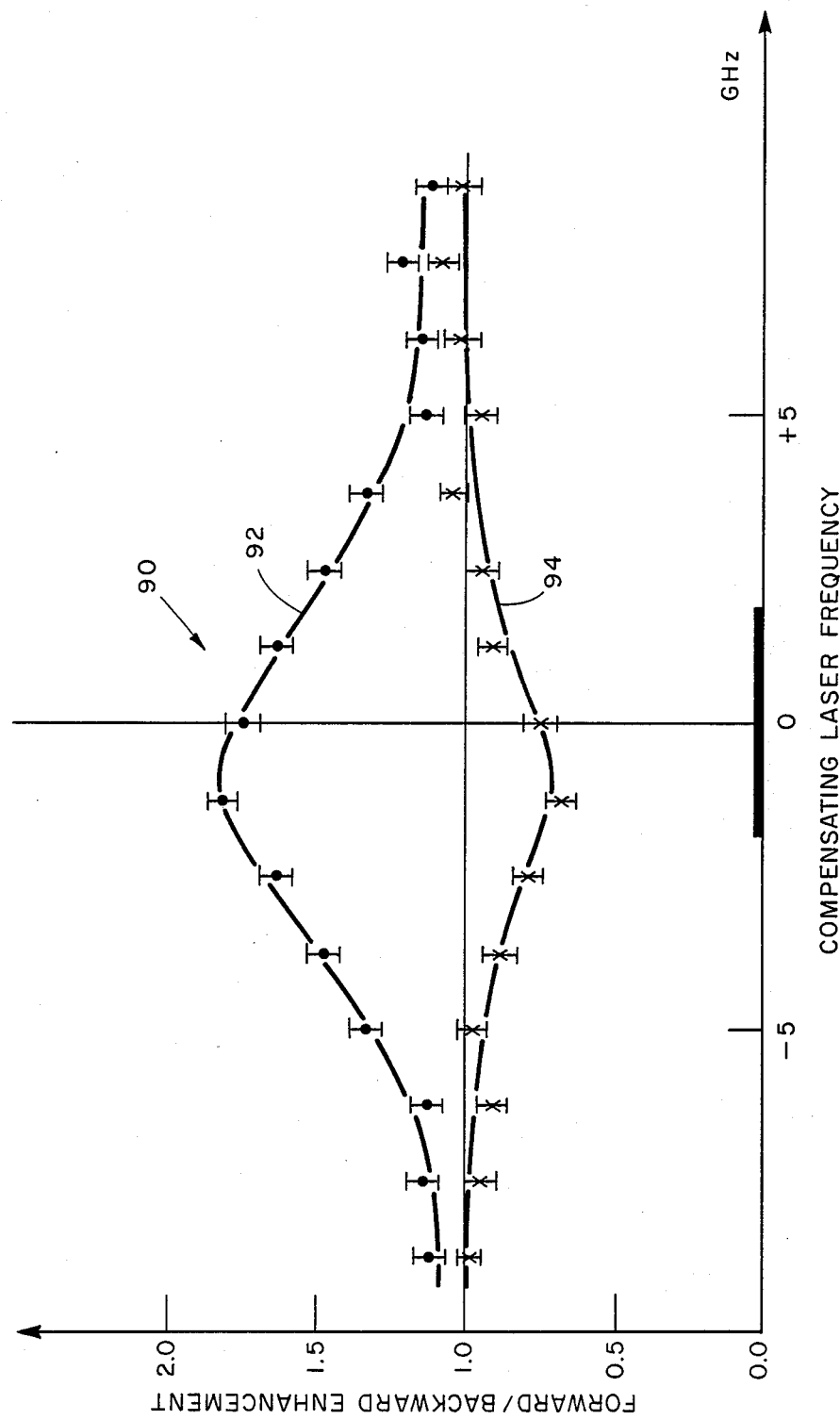
FIG. 4 is the experimental representation of forward-/backward enhancement of light as a function compensating laser frequency.

Best compensation is obtained when lasers 32 and 34 are circularly polarized in opposite directions which is achieved by having the two dye lasers linearly polarized in the perpendicular direction and passing them through a Fresnel rhomb such as shown by numeral 52 which acts like an achromatic $\frac{1}{4}$ plate (a polarizer). The intensity fluctuations within a single pulse are high (up to 50%) for the pump laser and rather low (less than 10%) for the compensating laser. Shot-to-shot frequency fluctuations for the compensating laser 34 are of the order of 10 MHz which is small compared to 4D fine structure splitting. The superfluorsecent or ASE signals (forward and backward) are filtered by monochromators and detected with photomultipliers 66 and 70. Output of photo tube establishes proper tuning of laser 34 by detection of 330.3 nm radiation by computer 68. The signals are then amplified, fed to analog-to-digital computers and processed by the computer 68. FIG. 4 shows the enhancement or amplitude 90 of forward and backward radiation of wavelength 819.6 nm as a function of the frequency of the compensating laser 34. Curves 92 and 94 of FIG. 4 represent the experimental results for the forward and backward 819.6 nm radiation. The pump laser intensity was set to a high value in order to observe the superfluorescence or ASE in both directions without Doppler compensation. Upon turning on the compensating laser and adjusting its intensity so as to tune through $3P_{3/2}$ $4D_{3/2,5/2}$ resonance, it is possible to observe an increase in the signal propagating in the forward direction and a decrease in the signal propagating in the backward direction. The compensating laser intensity is then adjusted to obtain the best forward/backward asymmetry. The pump laser intensity is then decreased so that in the absence of Doppler compensation no signal is detected in either direction. Finally, once the compensation conditions are applied, a signal in the forward direction is "switched on". The experimental results are shown in FIG. 4. This set up establishes that the presence of the compensating laser has allowed the superfluorescence to develop. No signal could be detected in the backward direction and the application of the compensation condition always leads to a decrease of this signal.

Briefly stated, a new method of light-by-light unidirectional amplification in an anistropic amplifying medium is based on the method of Doppler compensation by velocity-dependent light shifts leads to a new light amplifier, the time response of which is limited by the fact that the bandwidth of the compensatin pulse has to be small compared to the Doppler width of the atomic vapor. These widths are generally of the order of gigahertz ($=10^9$ Hz) which means that the response time cannot be shorter than a few nanoseconds. The rise and fall times of the switching are determined by the rise and fall times of the superfluoresent pulse which is of the order of 1 nanosecond. Such a switch makes it a unique tool for applications in optical communications, ring lasers, Doppler-free directed superradiance and Doppler-free coherent transients.

Obviously, many modifications and variations of the subject invention are possible in the light of the above teachings. As an example, a gaseous medium other than sodium vapor can be used with properly selected pump laser and compensating laser. Furthermore, pump laser and compensating laser of different but of optimum wavelength can also be used. It should be noted further that all components of the system used can be interchanged with equivalents without deviating from the teachings of subject invention. It is, therefore, to be understood that within the scope of the appended claims, the invention may be practiced otherwise than as specifically described.

What is claimed is:

1. A light-induced unidirectional light amplifier system which comprises:
    a gaseous medium having multiple excited atomic states;
    a first laser means to be used as a pump laser for obtaining population inversion between a first and a second preselected states, the first state being higher than the second state, of said multiple excited atomic states so as to create one of the conditions for anisotropic amplified spontaneous emission from the first preselected state to the second preselected state of said multiple excited atomic states and thus providing an amplifying medium; and
    a second laser means to be used as a compensating laser for exciting atoms of said gaseous medium from the second preselected state to a third preselected state of said multiple excited atomic states to compensate for Doppler broadening of the transition from the first preselected state to the second preselected state and thus obtaining anisotropy in the amplified spontaneous emission from the first preselected state to the second preselected state of said multiple atomic excitable states of said gaseous medium to form the light-induced unidirectional light amplifier system.

2. The light amplifier of claim 1 wherein said gaseous medium is sodium vapor contained in a cell at a relatively low pressure.

3. The light amplifier of claim 2 wherein said relatively low pressure of said sodium vapor contained in the cell is a few millitorrs.

4. The light amplifier system of claim 3 wherein the first and second preselected states are $3D_{3/2,5/2}$ and $3P_{3/2}$ for creating population inversion for $3D_{3/2,5/2} \rightarrow 3P_{3/2}$ transition.

5. The light amplifier system of claim 4 wherein the third preselected state for said compensating laser means for compensating Doppler broadening are $4D_{5/2}$ and $4D_{3/2}$ states of sodium.

6. The amplifier system of claim 5 wherein said pump laser light is of wavelength 685.6 nm.

7. The amplifier system of claim 6 wherein said compensating laser is tunable around a wavelength of 569 nm.

8. The amplifier system of claim 7 wherein the first preselected state to the second preselected state transition is of wavelength 820 nm.

9. The amplifier system of claim 8 which further includes a general computer programmed to obtain data automatically by tuning said compensating laser.

10. A light-induced unidirectional light amplifier system which comprises:
   a sodium vapor gaseous medium;
   a first laser means for obtaining a population inversion between two preselected excited states $3D_{3/2, 5/2}$ and $3P_{3/2}$ of said sodium vapor gaseous medium and thus creating amplified spontaneous emission (ASE); and
   a second laser means to be used as a compensating laser for tuning thereof between a preselected excited state $3P_{3/2}$ of said sodium vapor gaseous medium and preselected pair of $4D_{5/2}$, $4D_{3/2}$ excited states of said sodium vapor gaseous medium so as to compensate Doppler broadening of the transition and to obtain anisotropic amplifying medium from said sodium vapor gaseous medium and generating a unidirectional light amplifying medium.

* * * * *